(12) United States Patent
Miyamoto et al.

(10) Patent No.: US 11,760,204 B2
(45) Date of Patent: Sep. 19, 2023

(54) VEHICLE BRAKING DEVICE

(71) Applicant: MITSUBISHI JIDOSHA KOGYO KABUSHIKI KAISHA, Tokyo (JP)

(72) Inventors: Naoki Miyamoto, Tokyo (JP); Takanori Sugimoto, Tokyo (JP); Norihiko Ikoma, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/762,917

(22) PCT Filed: Mar. 29, 2021

(86) PCT No.: PCT/JP2021/013227
§ 371 (c)(1),
(2) Date: Mar. 23, 2022

(87) PCT Pub. No.: WO2021/220694
PCT Pub. Date: Nov. 4, 2021

(65) Prior Publication Data
US 2022/0396153 A1 Dec. 15, 2022

(30) Foreign Application Priority Data
Apr. 28, 2020 (JP) .................................. 2020-078924

(51) Int. Cl.
*B60L 7/26* (2006.01)
*B60T 8/32* (2006.01)
(Continued)

(52) U.S. Cl.
CPC .............. *B60L 7/26* (2013.01); *B60T 8/3215* (2013.01); *B60W 10/06* (2013.01); *B60W 10/08* (2013.01);
(Continued)

(58) Field of Classification Search
CPC ...... B60L 7/26; B60T 8/3215; B60T 2220/04; B60T 2250/04; B60T 2270/604;
(Continued)

(56) References Cited

U.S. PATENT DOCUMENTS 5,967,621 A * 10/1999 Ito ........................... B60L 3/108
303/3
2008/0100129 A1 * 5/2008 Lubbers .............. B60W 10/184
303/113.1
(Continued)

FOREIGN PATENT DOCUMENTS

JP 6314800 B2 4/2018

OTHER PUBLICATIONS

International Search Report, issued in PCT/JP2021/013227, PCT/ISA/210, dated Jun. 15, 2021.
(Continued)

*Primary Examiner* — Edwin A Young
(74) *Attorney, Agent, or Firm* — BIRCH, STEWART, KOLASCH & BIRCH, LLP (57) ABSTRACT

The disclosed vehicle braking device controls a hydraulic brake system (2) and a regeneration brake system (3) mounted on a vehicle (1) in accordance with an acceleration value and a brake value, and includes a first divider (11), a second divider (12), and a controller (13). The first divider (11) divides a driver demand torque set according to the accelerator value into a target coast torque and a remaining torque. The second divider (12) divides a sum of a deceleration torque set according to the brake value and the target coast torque divided by the first divider (11) into a hydraulic-brake demand torque and a regeneration-brake demand torque. The controller (13) controls the hydraulic brake system (2), using the hydraulic-brake demand torque, and controls the regeneration brake system (3), using a total
(Continued)

regeneration brake torque calculated from the remaining torque and the regeneration-brake demand torque. This configuration can improve the feeling of operating the brake, resolving the feeling of the shortage of deceleration.

18 Claims, 4 Drawing Sheets

(51) Int. Cl.
      *B60W 10/06*      (2006.01)
      *B60W 10/08*      (2006.01)
      *B60W 10/188*     (2012.01)
      *B60W 10/196*     (2012.01)
      *B60W 20/00*      (2016.01)
      *B60W 30/18*      (2012.01)

(52) U.S. Cl.
      CPC ........ *B60W 10/188* (2013.01); *B60W 10/196* (2013.01); *B60W 20/00* (2013.01); *B60W 30/18127* (2013.01); *B60W 30/18136* (2013.01); *B60T 2220/00* (2013.01); *B60T 2220/04* (2013.01); *B60T 2250/04* (2013.01); *B60T 2270/604* (2013.01); *B60W 2520/10* (2013.01); *B60W 2540/10* (2013.01); *B60W 2540/12* (2013.01); *B60W 2710/06* (2013.01); *B60W 2710/08* (2013.01); *B60W 2710/18* (2013.01)

(58) Field of Classification Search
      CPC .... B60W 10/06; B60W 10/08; B60W 10/188; B60W 10/196; B60W 20/00; B60W 30/18127; B60W 30/18136; B60W 2520/10; B60W 2540/10; B60W 2540/12; B60W 2710/06; B60W 2710/08; B60W 2710/18
      See application file for complete search history.

(56) References Cited

U.S. PATENT DOCUMENTS

| | | | |
|---|---|---|---|
| 2009/0260901 A1* | 10/2009 | Ishii | B62D 11/04 |
| | | | 701/70 |
| 2016/0137068 A1 | 5/2016 | Nada et al. | |
| 2018/0079313 A1* | 3/2018 | Foitzik | B60T 13/741 |
| 2021/0101598 A1* | 4/2021 | Kim | B60L 7/26 |

OTHER PUBLICATIONS

Written Opinion of the International Searching Authority, issued in PCT/JP2021/013227, PCT/ISA/237, dated Jun. 15, 2021.
Extended European Search Report dated Oct. 25, 2022 issued in corresponding European Application No. 21 796 964.1.

* cited by examiner

VEHICLE BRAKING DEVICE

TECHNICAL FIELD

The present invention relates to a vehicle braking device that controls a hydraulic brake system and a regeneration brake system mounted on a vehicle in accordance with an acceleration value and a brake value.

BACKGROUND TECHNIQUE

A control technique has conventionally been known which uses regeneration braking obtained by a regeneration brake system (motor) mounted on a vehicle and hydraulic braking obtained by a hydraulic brake system (friction brake system) mounted on the vehicle in harmony with each other. For example, a technique has been proposed which calculates independently of each other regeneration braking force and friction braking force that are originated from the operation of an accelerator pedal; calculates independently of each other regeneration braking force and friction braking force that are originated from the operation of a brake pedal; and harmonizes the regeneration braking and the hydraulic braking by summing the respective braking forces (see Patent Document 1).

PRIOR ART REFERENCE

Patent Document

[Patent Document 1]
Publication of Japanese Patent No. 6314800 (JP 6314800 B)

SUMMARY OF INVENTION

Problems to be Solved by Invention

Depending on the amount of chargeable electric power of the battery mounted on a vehicle, there is a possibility that regeneration braking force having a sufficient magnitude cannot be generated. For example, if the battery is almost fully charged, the regeneration brake electric power to change the battery becomes small in amount and the regeneration braking force becomes consequently small. In such a case, it is preferable to resolve the feeling of shortage of declaration by generating a friction braking force compensating for the shortage of the regeneration braking force. On the other hand, when the shortage of the regeneration braking force is simply compensated for by the friction braking force, some type of a hydraulic brake system generates braking force much smaller than that the driver expects and consequently, a feeling of operating the brake (reaction force, depression sensitivity, correspondence between stroke and deceleration, etc.) may deteriorate. Conventional techniques do not consider such points very much, and do leave a room for improvement.

With the foregoing problems in view, one of the objects of the present invention is to provide a vehicle braking device that improves the feeling of operating the brake, resolving the feeling of shortage of deceleration. In addition to this object, influences and effects which are derived from each configuration of an embodiment to carry out the invention to be described below and which conventional technique does not attain can be regarded as other objects of the present disclosure.

Means to Solve Problems of Invention

The disclosed vehicle braking device controls a hydraulic brake system and a regeneration brake system mounted on a vehicle in accordance with an acceleration value and a brake value, and includes a first divider, a second divider, and a controller.

The first divider divides a driver demand torque set according to the accelerator value into a target coast torque and a remaining torque, the target coast torque being targeted at being applied to the hydraulic brake system, the remaining torque being obtained by subtracting the target coast torque from the driver demand torque.

The second divider divides a sum of a deceleration torque set according to the brake value and the target coast torque divided by the first divider into a hydraulic-brake demand torque and a regeneration-brake demand torque.

The controller controls the hydraulic brake system, using the hydraulic-brake demand torque divided by the second divider, and controls the regeneration brake system, using a total regeneration brake torque calculated from the remaining torque divided by the first divider and the regeneration-brake demand torque divided by the second divider.

Effect of Invention

The disclosed vehicle controlling device optimizes a braking force of the hydraulic brake system, so that the feeling of operating the brake can be improved, resolving the feeling of the shortage of deceleration.

EMBODIMENT TO CARRY OUR INVENTION

1. Configuration of Device

Figure 1:
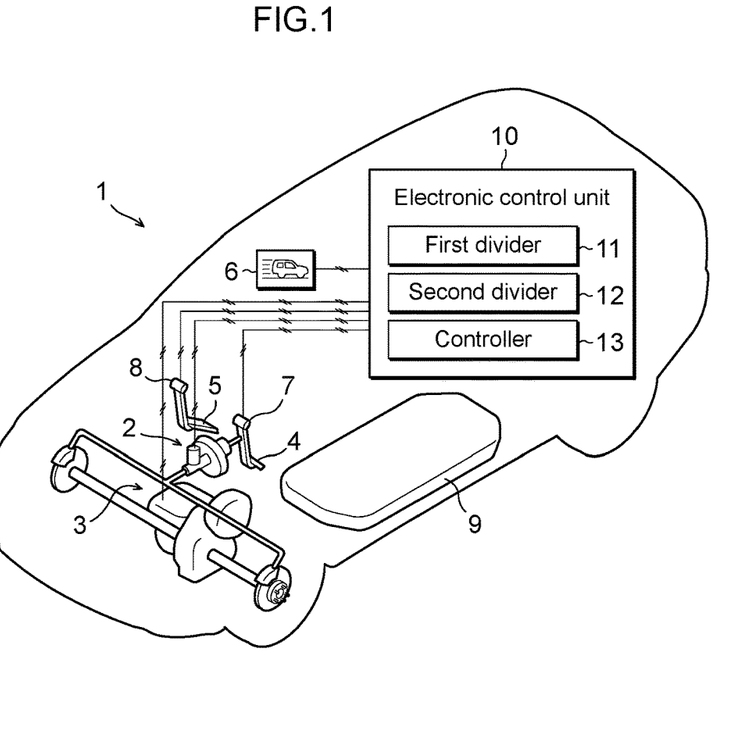
FIG. 1 is a diagram schematically illustrating a vehicle adopting a vehicle braking device according to an embodiment.

Referring to FIGS. 1 to 7, description will now be made in relation to a vehicle 1 adopting a vehicle braking device of an embodiment and a modification. The vehicle 1 is an electrically-moved vehicle (electric vehicle, a hybrid vehicle) mounted with at least a hydraulic brake system 2 and a regeneration brake system 3. As shown in FIG. 1, the vehicle 1 is mounted with a hydraulic brake system 2, a regeneration brake system 3, a brake pedal 4, an accelerator pedal 5, a vehicle speed sensor 6, a brake sensor 7, an accelerator sensor 8, and a battery 9.

The hydraulic brake system 2 is a brake device (automatic brake device) having a function of generating a friction braking force to the wheel without depending on the operation of the driver driving the vehicle 1. Every wheel provided in the vehicle 1 is fitted with a friction brake device such as a disc brake or a drum brake. The hydraulic brake system 2 has a function of automatically controlling these friction brake devices. The hydraulic brake system 2 of this embodiment has a mechanism that converts the amount of depressing the brake pedal 4 by the driver to hydraulic pressure (brake liquid pressure) and causes the friction brake device of each wheel to generate braking force by utilizing the hydraulic pressure.

Figure 2:
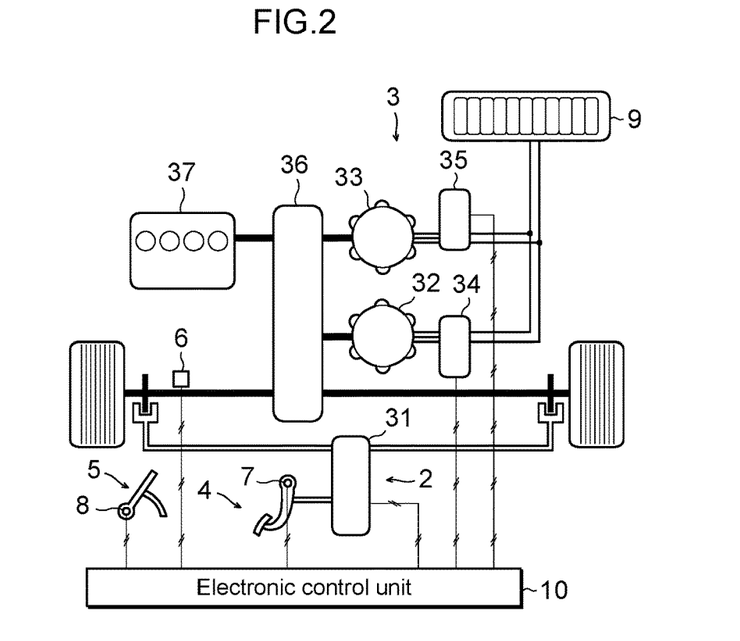
FIG. 2 is a schematic diagram illustrating the configuration of the vehicle braking device of FIG. 1.

As shown in FIG. 2, an electric brake booster 31 is incorporated in the hydraulic brake system 2. The electric brake booster 31 has a function of automatically moving, even when the brake pedal 4 is not being depressed, the brake pedal 4 to a desired position in accordance with a control signal from the electronic control unit 10 (i.e., a function of positively controlling the amount of depression of the brake pedal 4). Example of an additional function of the electric brake booster 31 includes a function of assisting the depressing force when the driver depresses the brake pedal 4, and a function of adjusting the reaction force of the brake pedal 4. However, when the driver depresses the brake pedal after the brake pedal is automatically moved by the electric booster (brake overriding), the feeling of operating the brake changes. This is caused by the structure of the electric booster. Specifically, a larger movement amount of the brake pedal more lowers the generated hydraulic pressure against the depressing force of the braking operation, leading to an undeppresable feeling.

The generation brake system 3 is a device that generates regeneration braking force by performing the regeneration braking. The regeneration brake system 3 includes an electric motor having a function of converting the rotational driving force of the wheels to electric power, and also includes a power storage device that stores the converted electric power. The regeneration brake system 3 of this embodiment is provided with, as shown in FIG. 2, a motor 32 connected to the battery 9. The motor 32 is connected to the wheels via a transaxle 36 (transmission). Further, to the transaxle 36, an engine 37 (internal combustion engine) which burns gasoline or light oil is connected.

The motor 32 is, for example, a synchronous motor of the three-phase AC power type, and is connected to the battery 9 via an inverter 34. The motor 32 has both a function of generating the driving force of the vehicle 1 with the electric power of the battery 9 and a function of generating electric power by utilizing the inertial power of the vehicle 1. A generator 33 is, for example, a synchronous generator of the three-phase AC power type, and is connected to the battery 9 via an inverter 35. The generator 33 has both a function (starter function) of rotating the crankshaft of the engine 37 with the electric power of the battery 9 and a function of generating electric power by utilizing the rotational power of the engine 37.

The transaxle 36 is a power transmission device including a transmission and a final drive gear, and is connected to the wheel shaft connected on the left and right wheels (front and rear wheels), the motor 32, the generator 33, and the engine 37. Inside the transaxle 36, a clutch is incorporated which disconnects the generator 33 and the engine 37 from the transmission path of the driving force according to the running state of the vehicle 1. Under a state where the clutch is disengaged (opened), the motor 32 functions as the regeneration braking device 3, and under a state of the clutch of the transaxle 36 is engaged, the engine brake by the engine 37 and the motor 32 function as the regeneration brake system 3. Regeneration means that the vehicle inertial force is converted into braking force by the motor 32.

Examples of the battery 9 is a lithium-ion battery or a nickel-metal hydride battery, and is a secondary battery capable of supplying a high voltage DC current of several hundred volts. Further, the inverter 34 for motor is an electric power converting device that converts the DC power on the side of the battery 9 and the AC power on the side of the motor 32, and the inverter 35 for generator is an electric power converting device the converts the DC power on the side of the battery 9 and the AC power on the side of the generator 33. The inverters 34 and 35 each incorporate therein an inverter circuit including a switch element. By controlling the operating states (opening-closing timing and opening-closing frequency of the switch elements) of the inverter circuits, the outputs (discharging amounts) and an amount regeneration braking of the motor 32 and the generator 33 are controlled.

Figure 3:
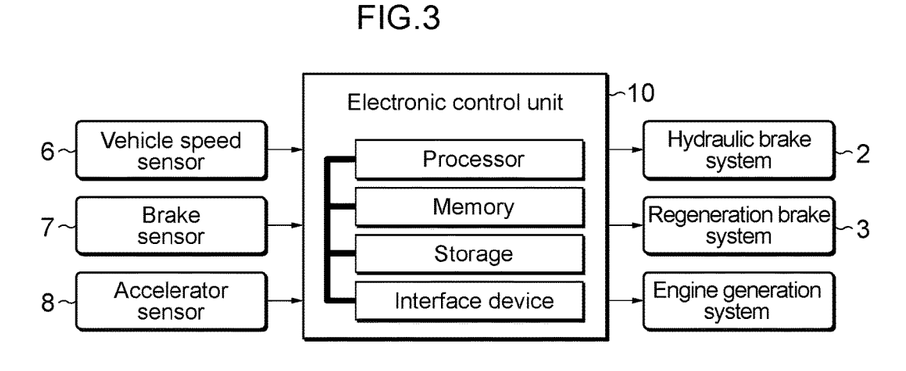
FIG. 3 is a block diagram illustrating an electronic control unit of FIG. 1.

The operating states of the inverters 34, 35 are controlled by the electronic control unit 10. The electronic control unit 10 is an electronic control unit (computer) that controls the state of the regeneration braking by managing the on-off state of the switch elements incorporated in the inverters 34 and 35. As shown in FIG. 3, the electronic control device 10 incorporates therein a processor (central processing unit), a memory (main memory), a storage device (storage), an interface device, and the like, which are communicably connected to one another via an internal bus.

To the electronic control unit 10, the hydraulic brake system 2, the regeneration brake system 3, the vehicle speed sensor 6, the brake sensor 7, and the accelerator sensor 8 are connected. The vehicle speed sensor 6 is a sensor that detects the traveling speed (vehicle speed) of the vehicle 1. The brake sensor 7 is a sensor that detects an amount (brake value) of depression of the brake pedal 4. The accelerator sensor 8 is a sensor that detects the amount (accelerator value) of depression of the accelerator pedal 5. The electronic control unit 10 controls the hydraulic brake system 2, the regeneration brake system 3, and the engine generation system on the basis of the information detected by these sensors 6-8. Here, the engine generation system refers to a device that performs power generation by the engine 37 and the generator 33. Power generation means that the engine output is converted to electric power by the generator 33 and the electric power is used as driving force of the motor 32 and the battery 9 for driving is charged with the surplus electric power.

2. Configuration of Control

Figure 4:
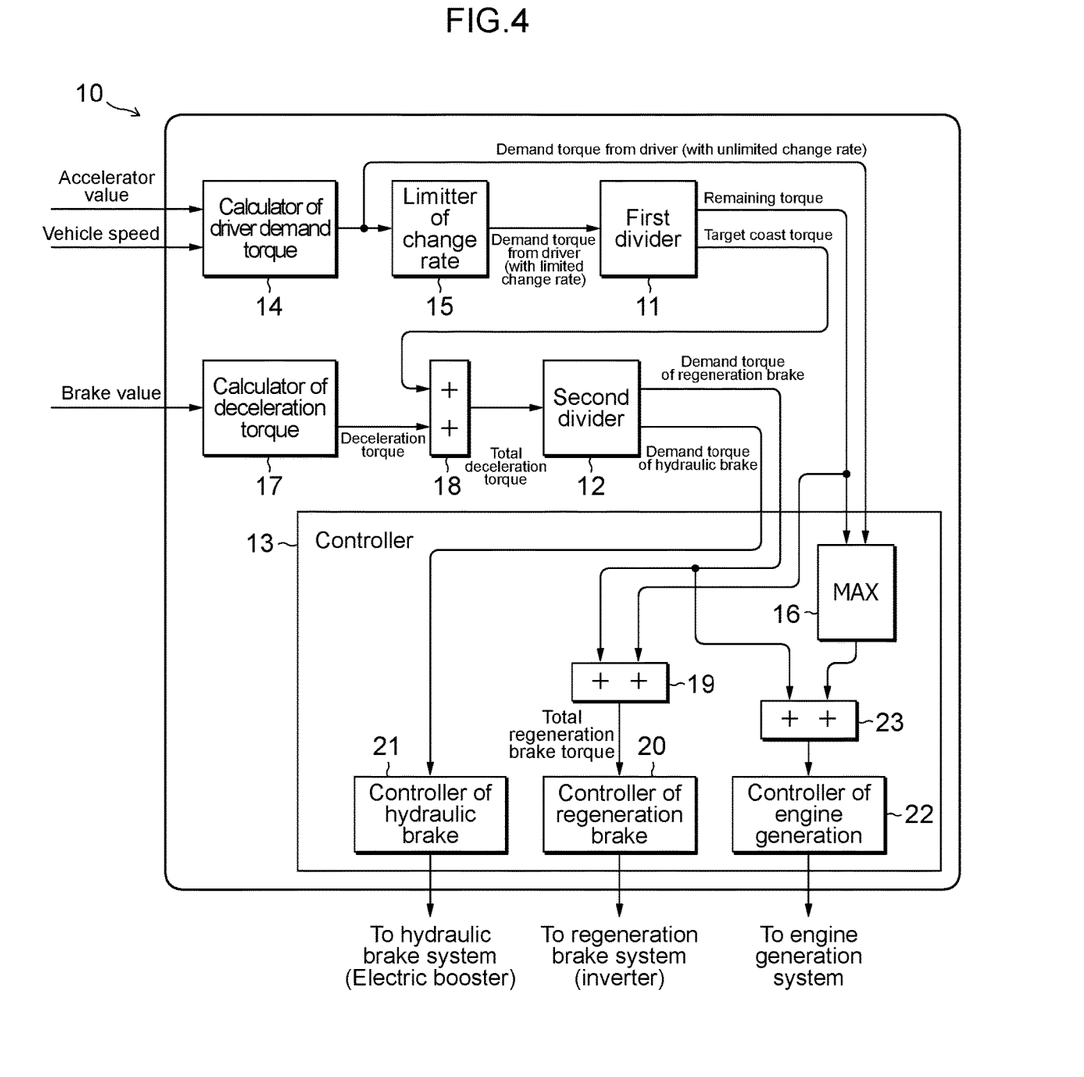
FIG. 4 is a block diagram illustrating the processes performed in the electronic control unit of FIG. 1.

As shown in FIG. 1, inside the electronic control unit 10, at least the first divider 11, the second divider 12, and the controller 13 are provided. These elements represent functions of the electronic control unit 10 being classified for convenience. As shown in FIG. 4, the electronic control unit 10 of the present embodiment is provide with the first divider 11, the second divider 12, the controller 13, a calculator 14 of driver demand torque, a limiter 15 of change rate, a selector 16 for maximum value, a calculator 17 of deceleration torque, a first adder 18, a second adder 19, a controller 20 of regeneration brake, and a controller 21 of hydraulic brake. Here, the selector 16 for maximum value, the second adder 19, the controller 20 of regeneration brake, and the controller 21 of hydraulic brake are included in the controller 13.

Each element shown in FIG. 4 can be described as an independent program or a composite program in combination with multiple elements. A program corresponding to each element shown in FIG. 4 is stored in the memory or the storage device of the electronic control unit 10, and is executed by the processor. The elements shown in FIG. 4 are related to the control of the braking force, and elements related to the control of the driving force are omitted.

The calculator 14 of driver demand torque calculates and sets a demand torque from driver (driver demand torque) based on at least the accelerator value. For example, when the accelerator value is large, the demand torque from driver is set in a positive range. When the accelerator value is small or when the accelerator is off, the demand torque from driver is set in a negative range. The calculator 14 of driver demand torque of the present embodiment calculates the demand torque from driver based on the accelerator value and the vehicle speed. The information of the demand torque from driver calculated here is transmitted to the limiter 15 of change rate and the selector 16 for maximum value. When the shift position is changed from the D range to the B range, which has a stronger braking force, the demand torque from driver when the accelerator is off increases further in the negative direction and helps the driver to decelerate the vehicle. At this time, in order to obtain the same braking force, the brake value is smaller in the B range than in the D range. In addition, in the case of the one-pedal operation that accelerates/decelerates the vehicle only by the accelerator operation, the demand torque from driver when the accelerator is off further increases in the negative direction.

The limiter 15 of change rate performs a "smoothing process" that suppresses a sudden change in the demand torque from driver. In this case, the amount (time change rate) of change in demand torque from driver per unit time is limited. The limit when the demand torque from driver is increasing may be different from the limit when the demand torque from driver is decreasing. The information of the demand torque from driver (with a limited change value) after being subjected to the smoothing process is transmitted to the first divider 11.

The first divider 11 calculates a target coast torque and a remaining torque that are divided from the demand torque from driver transmitted from the limiter 15 of change rate. The target coast torque is a torque having a magnitude that is targeted at being applied to (being borne by) the hydraulic brake system 2, and for example, is set when the demand torque from driver is negative. The value of the target coast torque is set to the same value as one having a larger absolute value between a predetermined limit value and the demand torque from driver transmitted from the limiter 15 of change rate. Further, the remaining torque is a torque that is not applied to the hydraulic brake system 2, and is a torque having a magnitude obtained by subtracting the target coast torque from the demand torque from driver. Typically, the demand torque from driver, the target coast torque, and the remaining torque are all negative values. Here, during one pedal operation, since less frequent operation of the brake requires definite deceleration in response to operation of the accelerator, the target coast torque does not have to be set limited and may be set to the same value as the demand torque from driver.

The remaining torque of the present embodiment is applied the regeneration braking device 3 only when the regeneration brake system 3 has a sufficient capacity (when the electric power chargeable the battery is sufficiently large). When the regeneration brake system 3 has an insufficient capacity (when electric power chargeable the battery is not sufficient), the remaining torque is not applied the hydraulic brake system 2 or the regeneration brake system 3 and is consequently discarded. Information of the target coast torque calculated here is transmitted to the first adder 18, the information of the remaining torque is transmitted to the selector 16 for maximum value and the second adder 19.

Three examples of a method of setting the limit value in the first divider 11 are listed below. The first method sets the limit value to a "predetermined fixed value". In this case, it is conceivable to set the limit value to a value (e.g., about −320 [Nm]) corresponding to the engine brake torque during the normal running in the D range. With such a setting, when the absolute value of the demand torque from driver is smaller than the limit value (for example, in the range of −320 to 0 [Nm]), the braking force equivalent to the engine brake can be applied to at least the hydraulic brake system 2, thereby alleviating the feeling of shortage of the braking force (the feeling of insufficient braking). Here, if the demand torque from driver becomes larger in the negative direction than −320 Nm by operating the shift into the B range, the target coast torque may be limited by the limit value, resulting in insufficient deceleration. However, the movement value of the brake pedal is constant, and a feeling of brake operation after the accelerator is off does not change.

The second method sets the limit value to a variable value that varies with the state of the regeneration brake system 3. One of the conceivable examples is that the limit value of the first method is adopted only when the absolute value of the demand torque from driver is larger than the absolute value of a regeneration limit torque given by the following Expression 1, and is otherwise 0 Nm. The regeneration limit torque shown in Expression 1 is a torque consumed on the power train as a part of the deceleration torque, and includes an engine friction torque (negative value) and a torque having a magnitude obtained by multiplying a coefficient (conversion factor) and a value obtained by dividing a sum of electric power chargeable a battery (chargeable electric power of the battery, negative value), accessory consumption electric power, and lost electric power (motor lost electric power) of the regeneration brake system 3 by a vehicle speed. Incidentally, the engine friction torque is a value added only when the clutch of the transaxle 36 is engaged, and is 0 when the clutch is not engaged. By reflecting the state of the regeneration brake system 3 in the target coast torque, the target value of the torque to be applied to the hydraulic brake system 2 is rationalized. Thereby, since the braking force can be secured by the hydraulic brake system only when the remaining torque is limited to being regenerated, the insufficient braking can be surely avoided while minimizing the frequency of deterioration of the feeling of operating the brake.

regeneration limit torque = [Expression 1]

{(electric power chargeable a battery) −

(accessory consumption electric power) −

(motor lost electric power)} ∗

(coefficient)/(vehicle speed) +

(engine friction torque) ∗ (engine shaft deceleration ratio)

(regeneration limit torque) =

$$\frac{\left(\begin{array}{c}\text{electric power}\\\text{chargeable a battery}\end{array}\right) - \left(\begin{array}{c}\text{accessory consumption}\\\text{electric power}\end{array}\right) - \left(\begin{array}{c}\text{most lost}\\\text{electric power}\end{array}\right)}{\text{vehicle speed}} \times (\text{coefficient}) +$$

-continued (engine friction torque)×(engine shaft deceleration ratio)

Figure 5:
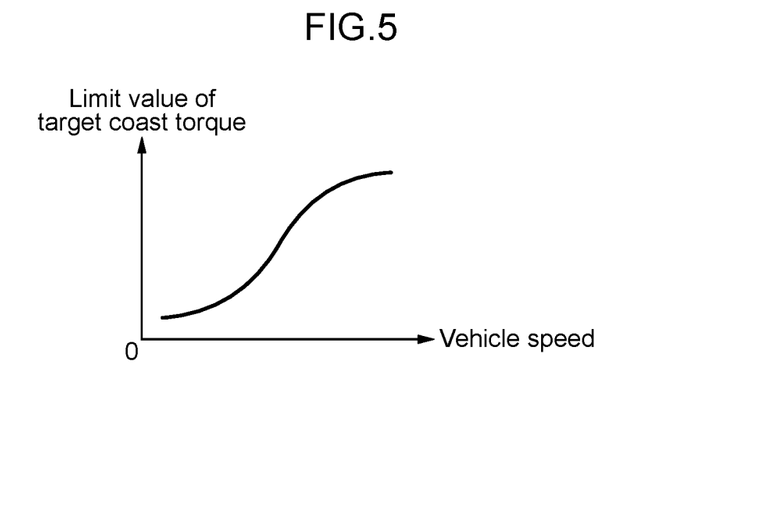
FIG. 5 is a graph showing a relationship between a vehicle speed and a limit value.

The third method sets the limit value to a variable value that varies with the running state of the vehicle 1. For example, it is conceivable to set the limit value according to the vehicle speed. The relationship between the vehicle speed and the limit value may be stored in the electronic control unit 10 in advance in the form of a map or a mathematical expression. FIG. 5 is a graph showing a relationship between the vehicle speed and the limit value, and shows the corresponding relationship in the case where the limit value is set smaller as the vehicle speed is lower. In general, a slower vehicle speed frequently requires delicate and accurate depressing operation of the brake pedal 4. By setting a small limit value for low-speed running, the target coast torque comes to be relatively small, suppressing worsening of the feeling of operating the brake.

The selector 16 for maximum value selects a one having a larger absolute value between the demand torque from driver calculated by the calculator 14 of driver demand torque and the remaining torque calculated by the first divider 11 and outputs the selected torque. The demand torque from driver to be compared with the remaining torque is the demand torque from driver (without a limited change value) before being subjected to the smoothing process performed by the limiter 15 of change rate. The information of the one selected torque is transmitted to the controller 22 of engine generation via the third adder 23. The third adder 23 adds the one torque selected by the selector 16 for maximum value to the demand torque of regeneration brake calculated by the second divider 12 and outputs the sum to the controller 22 of engine generation. Further, the controller 22 of engine generation controls the engine generation system according to the torque transmitted from the third adder 23.

When the driver request torque is positive and increasing, the absolute value of the demand torque from driver without a limited change rate becomes larger than the absolute value of the driver request torque with a limited change rate. Therefore, the selector 16 for maximum value selects the demand torque from driver without a limited change rate and transmits the information of the selected torque to the controller 22 of engine generation. On the other hand, when the demand torque from driver is positive and decreasing, the absolute value of the remaining torque is sometimes larger than the absolute value of the demand torque from driver (without a limited change rate). In this case, the selector 16 for maximum value selects the remaining torque and transmits the information of the remaining torque to the controller 22 of engine generation. As the above, the selector 16 for maximum value functions to reduce the shortage of the engine generation output caused by the difference between the demand torque from driver by the limiter 15 of change rate and the remaining torque by the first divider 11.

The calculator 17 of deceleration torque calculates and sets the deceleration torque based on at least the brake value. The value of the deceleration torque is set within the negative range, and also set so as to have a larger absolute value as the amount of depression of the brake pedal 4 is larger. Alternatively, the deceleration torque may be calculated and set in consideration the depressing speed of the brake pedal. The information of the deceleration torque calculated here is transmitted to the first adder 18.

The first adder 18 calculates a total deceleration torque by adding the target coast torque calculated by the first divider 11 and the deceleration torque calculated by the calculator 17 of deceleration torque. The information of the total deceleration torque is transmitted to the second divider 12.

The second divider 12 divides the total deceleration torque calculated by the first adder 18 into a demand torque of hydraulic brake (hydraulic-brake demand torque) and a demand torque of regeneration brake (regeneration-brake demand torque). The demand torque of hydraulic brake is the torque to be applied to the hydraulic brake system 2 as a part the total deceleration torque, and the demand torque of regeneration brake is the torque to be applied to the regeneration brake system 3 as a part the total deceleration torque. Each value of the demand torque of hydraulic brake and the demand torque of regeneration brake is calculated on the basis of, for example, the electric power chargeable the battery and the vehicle speed. The information of the demand torque of regeneration brake calculated here is transmitted to the second adder 19. Further, the information of the demand torque of hydraulic brake is transmitted to the controller 21 of hydraulic brake.

The second adder 19 calculates a total regeneration brake torque by adding the remaining torque and the demand torque of regeneration brake calculated by the second divider 12. Information of the total regeneration brake torque is transmitted to the controller 20 of regeneration brake.

The controller 20 of regeneration brake controls the operating state of the regeneration brake system 3 by outputting a control signal to the regeneration brake system 3. The control signal to the regeneration brake system 3 is generated on the basis of the total regeneration brake torque. For example, when the motor 32 is made generation brake the vehicle, the operating state of the motor inverter 34 is controlled by the control signal. Consequently, the brake torque corresponding to the total regeneration brake torque is generated by the regeneration brake system 3.

The controller 21 of hydraulic brake controls the operating state of the hydraulic brake system 2 by outputting a control signal to the hydraulic brake system 2. The control signal to the hydraulic brake system 2 is generated on the basis of the demand torque of hydraulic brake. This control signal controls, for example, the operating state of the electric brake booster 31, and causes the hydraulic brake system 2 to generate a brake torque corresponding to the demand torque of hydraulic brake.

3. Influence and Effect (1) As shown in FIG. 4, in the first divider 11, the demand torque from driver set in accordance with the accelerator value is divided into the target coast torque and the remaining torque. The target coast torque divided here is added to the deceleration torque set according to the brake value and the resultant total torque is transmitted to the second divider 12, which divides the total torque into the demand torque of hydraulic brake and the demand torque of regeneration brake. In response, the controller 21 of hydraulic brake of the controller 13 controls the hydraulic brake system 2 on the basis of the demand torque of hydraulic brake. On the other hand, the controller 20 of regeneration brake of the controller 13 controls the regeneration brake system 3 on the basis of the total regeneration brake torque calculated from the remaining torque and the demand torque of regeneration brake.

For example, this control configuration makes it easy to set the target coast torque in the event of the repressing operation of the accelerator pedal or the operation when the accelerator is off and to generate the friction braking force and the regeneration braking force. In addition, by setting the ratio of the remaining torque from the demand torque from driver larger, the value of the target coast torque becomes smaller. Consequently, it is possible to suppress the deterioration of the feeling of operating the brake due to excessive automatic braking force in the accelerator-off state, ensuring moderate drivability against the accelerator operation when the regeneration brake is limited. Therefore, the feeling of operating the brake can be improved while eliminating the feeling of shortage of deceleration.

(2) In the first divider 11, when the demand torque from driver is a negative value, the value of the target coast torque is set to the same value as one having a smaller absolute value between the predetermined limit value and the demand torque from driver. This control configuration sets, for example, the target coast torque to the same value as the limit value even when the absolute value of the demand torque from driver is equal to or higher than the limit value, so that the braking force corresponding to the limit value can be ensured. Therefore, by limiting the movement amount of the brake pedal while alleviating the feeling of shortage of the braking force (feeling of insufficient braking), the feeling against the brake pedal when the accelerator is off can be kept constant. Further, when the absolute value of the demand torque from driver is the limit value, the target coast torque is set to the same value as the demand torque from driver, so that the braking force matching the operation of the driver can be generated.

(3) In setting the limit value, the limit value may be set as a predetermined fixed value corresponding to the engine brake torque when the shift is in the D range. In this case, the same braking force as the engine brake can be applied to the hydraulic brake system 2, and consequently the feeling of shortage of the braking force (the feeling of the insufficient braking) can be alleviated. Further, even when the shift is changed to the B range, the magnitude of the braking force corresponding to the same brake value can be made the same as that in the D range, thereby improving the feeling of operating the brake.

(4) Further, the limit value may be set to a value corresponding to a regeneration limit torque being consumed on a power train. In this case, the braking force corresponding to the demand torque from driver can be ensured. For example, when the electric power chargeable the battery is small in low-temperature environment, the limit value can be set to a large value according to the electric power to eliminate the feeling of shortage of deceleration, and when the electric power chargeable the battery is sufficiently large, the limit value can be set to a small value to improve the feeling of operating the brake.

(5) As shown in Expression 1, the regeneration limit torque may include a torque having a magnitude obtained by multiplying a coefficient and a value obtained by dividing a sum of electric power chargeable a battery, accessory consumption electric power, and lost electric power of the motor by a vehicle speed. This scheme method can reflect the operation state of the entire power train in the limit value, so that the value of the target coast torque can be rationalized. In addition, in the vehicle 1 in which the engine 37 is mounted, by including the engine friction torque in the regeneration limit torque, it is possible to further rationalize the value of the target coast torque. Therefore, the feeling of operating the brake can be improved while eliminating the feeling of shortage of deceleration.

(6) As shown in FIG. 5, a lower limit value may be set when the vehicle speed is lower. This setting can set the value of the target coast torque for low-speed running to relatively small and it is possible to suppress the deterioration of the feeling of operating the brake due to excessive automatic braking force.

Figure 6A:
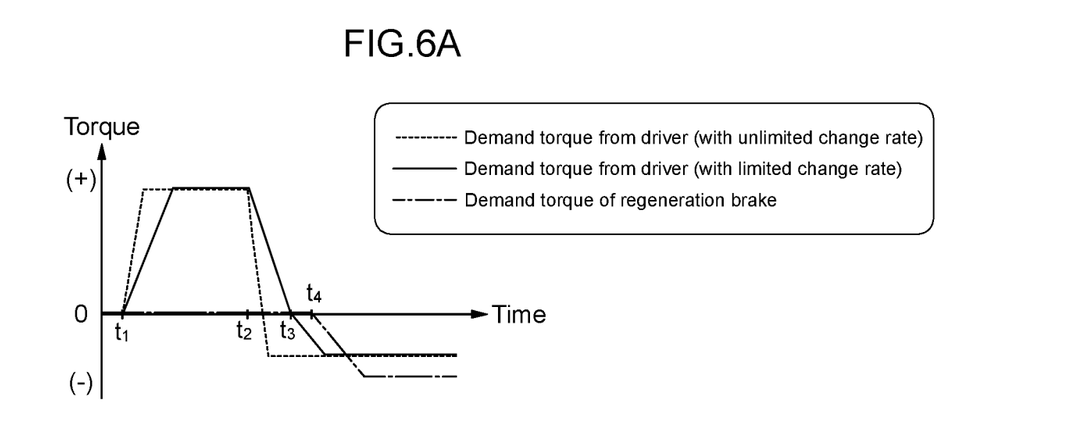
FIGS. 6(A) and 6(B) are graphs showing changes of total regeneration brake torque.
Figure 6B:
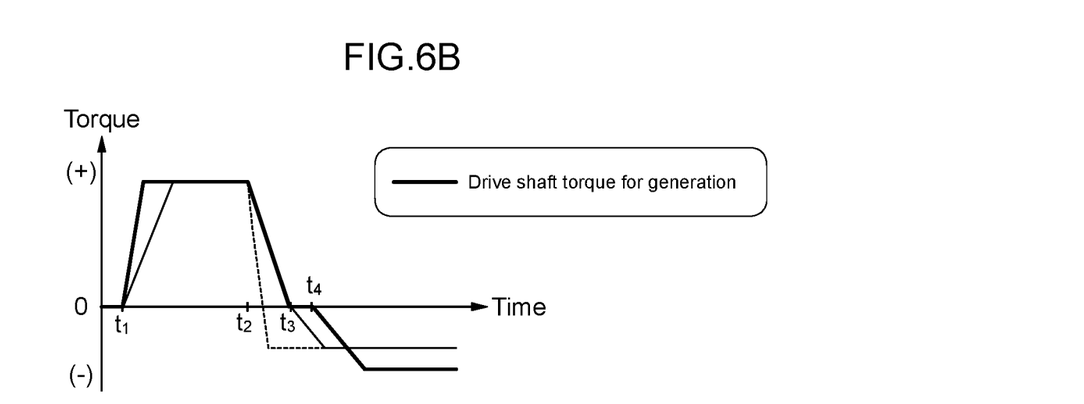

(7) In order to calculate a correct demand generated electric power referred for the purpose of engine generation, the selector 16 for maximum value adjusts a difference in torque between a driver operation, such as a transient torque delay by the limiter 15 of change rate and a regeneration torque addition in the second divider 12, and a final demand torque from drive shaft (if being a negative value, the total regeneration brake torque). The case where the demand torque from driver is positive and increasing corresponds to, in FIG. 6, a section from the time t1, at which the accelerator is started to be depressed, to the time t2, at which the depression of the accelerator is eased, and the torque without the limited change rate is selected. The case where the demand torque from driver is positive and decreasing corresponds to, in FIG. 6, a section from the time t2 to the time t3, at which the demand torque from drive shaft becomes 0, and the torque with the limited change rate is selected.

Further, the case where the demand torque from drive shaft is negative corresponds to, in FIG. 6, a section from the time t3 to the time t4, at which the regeneration torque is added, and the demand torque from drive shaft is obtained by preventing the torque of both the accelerator operation and the brake operation divided by the first divider 11 and the second divider 12 from being redundantly added. Consequently, while the demand torque from driver is increasing, the response delay of the accelerator operation due to the lack of power generation is suppressed by increasing the generated electric power, and excessive discharge due to the lack of electric power generation can be prevented while the demand torque from driver is decreasing or is negative.

4. Modification

The foregoing embodiment is illustrative only and is not intended to preclude the application of various modifications and techniques not explicitly set forth in the present examples. Each configuration of the present embodiment can be variously modified and implemented without departing from the scope thereof. Also, the configuration can be selected or omitted according to the requirement or can be appropriately combined. For example, the above embodiment uses a hybrid vehicle including the motor 32, the generator 33, and the engine 37 as the power train, but the generator 33 and the engine 37 can be omitted. The above vehicle braking device can be applied to a vehicle mounted with a motor or a generator having at least a regeneration braking function.

Figure 7:
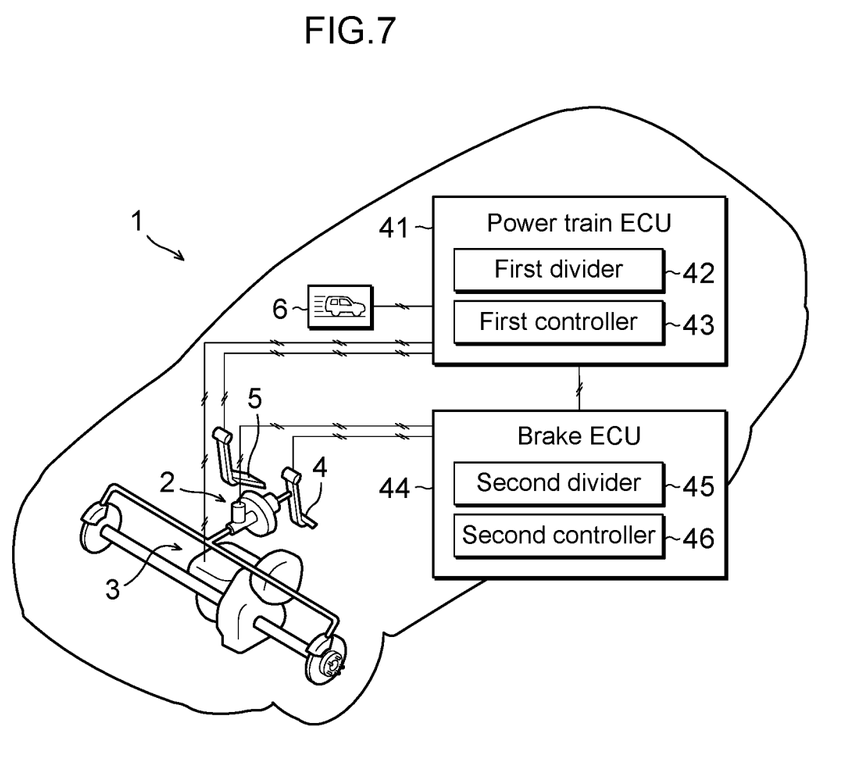
FIG. 7 is a diagram schematically illustrating a vehicle adopting a vehicle braking device according to a modification.

Further, the configuration of the electronic control unit 10 shown in FIG. 4 can be achieved by multiple ECUs. Alternatively, as shown in FIG. 7, a power train ECU 41 that is in charge of controlling the power train may be provided with a first divider 42 and a first controller 43, and a brake ECU 44 that is in charge of controlling the brake system may be provided with a second divider 45 and a second controller 46. The first divider 42, the second divider 45, the first controller 43, and the second controller 46, correspond to the first divider 11, the second divider 12, the controller 20 of regeneration brake, and the controller 21 of hydraulic brake of the above embodiment, respectively. The alternative control configuration can bring the same influence and effects as those of the above vehicle braking device.

DESCRIPTION OF REFERENCE SIGNS

1: vehicle
2: hydraulic brake system

3: regeneration brake system
4: brake pedal
5: accelerator pedal
6: vehicle speed sensor
7: brake sensor
8: accelerator sensor
9: battery
10: electronic control unit
11: first divider
12: second divider
13: controller
14: calculator of driver demand torque
15: limiter of change rate
16: selector for maximum value
17: calculator of deceleration torque
18: first adder
19: second adder
20: controller of regeneration brake
21: controller of hydraulic brake
22: controller of engine generation
23: third adder
31: electric brake booster
32: motor
33: generator
34: inverter for motor
35: inverter for generator
36: transaxle
37: engine

The invention claimed is:

1. A vehicle braking device that controls a hydraulic brake system and a regeneration brake system mounted on a vehicle in accordance with an acceleration value and a brake value, the vehicle braking device comprising:
a first divider that divides a driver demand torque set according to the acceleration value into a target coast torque and a remaining torque, the target coast torque being targeted at being applied to the hydraulic brake system, the remaining torque being obtained by subtracting the target coast torque from the driver demand torque;
a second divider that divides a sum of a deceleration torque set according to the brake value and the target coast torque divided by the first divider into a hydraulic-brake demand torque and a regeneration-brake demand torque; and
a controller that controls the hydraulic brake system, using the hydraulic-brake demand torque divided by the second divider, and controls the regeneration brake system, using a total regeneration brake torque calculated from the remaining torque divided by the first divider and the regeneration-brake demand torque divided by the second divider.

2. The vehicle braking device according to claim 1, wherein the first divider sets the target coast torque to a same value as one having a larger absolute value between a predetermined limit value and the driver demand torque.

3. The vehicle braking device according to claim 2, wherein the first divider sets the predetermined limit value to a value corresponding to an engine brake torque.

4. The vehicle braking device according to claim 3, wherein the first divider sets the predetermined limit value to be smaller as a vehicle speed is lower.

5. The vehicle braking device according to claim 4, wherein the controller calculates an engine generation electric power by using a torque obtained by adding the total regeneration brake torque to a larger one of the driver demand torque and the remaining torque.

6. The vehicle braking device according to claim 3, wherein the controller calculates an engine generation electric power by using a torque obtained by adding the total regeneration brake torque to a larger one of the driver demand torque and the remaining torque.

7. The vehicle braking device according to claim 2, wherein the first divider sets the predetermined limit value to a value corresponding to a regeneration limit torque being consumed on a power train as a part of the deceleration torque.

8. The vehicle braking device according to claim 7, wherein the regeneration limit torque includes an engine friction torque and a torque having a magnitude obtained by multiplying a coefficient and a value obtained by dividing a sum of an electric power chargeable a battery, an accessory consumption electric power, and a lost electric power of the regeneration brake system by a vehicle speed.

9. The vehicle braking device according to claim 8, wherein the first divider sets the predetermined limit value to be smaller as the vehicle speed is lower.

10. The vehicle braking device according to claim 9, wherein the controller calculates an engine generation electric power by using a torque obtained by adding the total regeneration brake torque to a larger one of the driver demand torque and the remaining torque.

11. The vehicle braking device according to claim 8, wherein the controller calculates an engine generation electric power by using a torque obtained by adding the total regeneration brake torque to a larger one of the driver demand torque and the remaining torque.

12. The vehicle braking device according to claim 7, wherein the first divider sets the predetermined limit value to be smaller as a vehicle speed is lower.

13. The vehicle braking device according to claim 12, wherein the controller calculates an engine generation electric power by using a torque obtained by adding the total regeneration brake torque to a larger one of the driver demand torque and the remaining torque.

14. The vehicle braking device according to claim 7, wherein the controller calculates an engine generation electric power by using a torque obtained by adding the total regeneration brake torque to a larger one of the driver demand torque and the remaining torque.

15. The vehicle braking device according to claim 2, wherein the first divider sets the predetermined limit value to be smaller as a vehicle speed is lower.

16. The vehicle braking device according to claim 15, wherein the controller calculates an engine generation electric power by using a torque obtained by adding the total regeneration brake torque to a larger one of the driver demand torque and the remaining torque.

17. The vehicle braking device according to claim 2, wherein the controller calculates an engine generation electric power by using a torque obtained by adding the total regeneration brake torque to a larger one of the driver demand torque and the remaining torque.

18. The vehicle braking device according to claim 1, wherein the controller calculates an engine generation electric power by using a torque obtained by adding the total regeneration brake torque to a larger one of the driver demand torque and the remaining torque.

* * * * *